Jan. 11, 1927.
R. SURTEES
1,614,409
MACHINE FOR EMULSIFYING, MIXING, OR GRINDING MATERIALS
Filed May 28, 1926     3 Sheets-Sheet 3
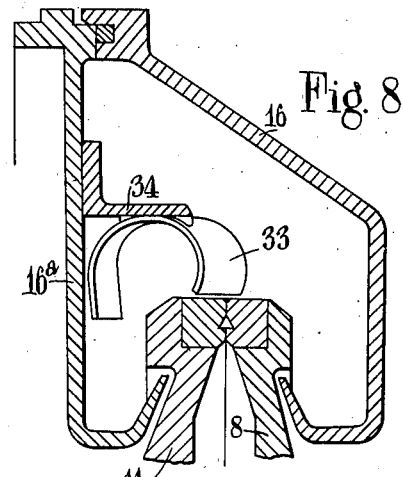
Fig. 8.
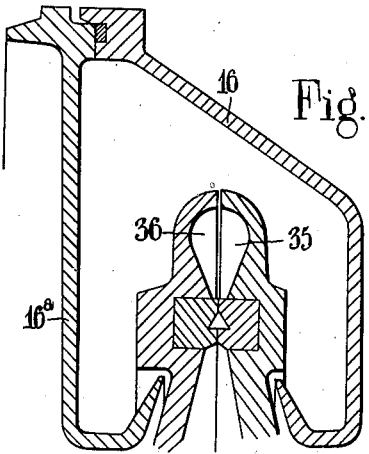
Fig. 10.
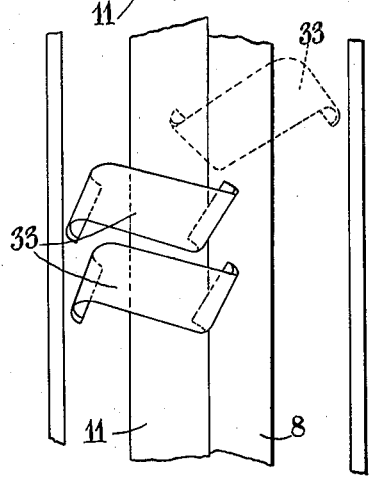
Fig. 9.
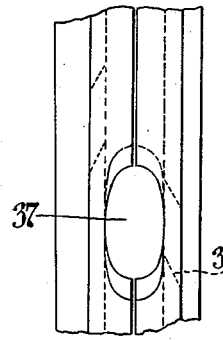
Fig. 11.
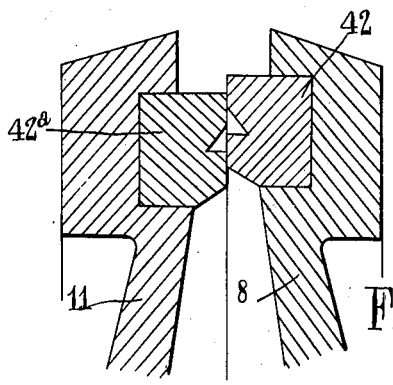
Fig. 13.
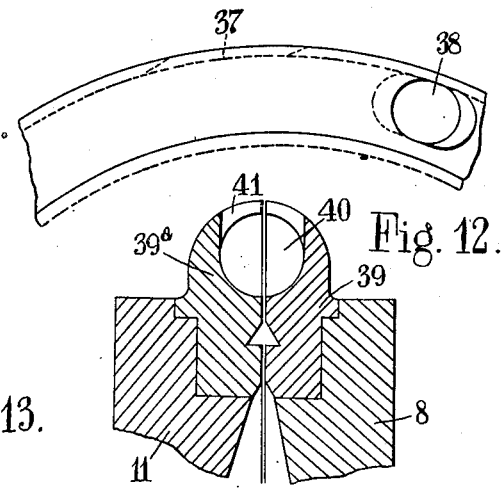
Fig. 12.
Fig. 14.
R. Surtees
inventor
By: Marks & Clerk
Attys Patented Jan. 11, 1927.

1,614,409

UNITED STATES PATENT OFFICE.

ROBERT SURTEES, OF GATESHEAD, ENGLAND.

MACHINE FOR EMULSIFYING, MIXING, OR GRINDING MATERIALS.

Application filed May 28, 1926, Serial No. 112,394, and in Great Britain January 5, 1926.

This invention relates to machines for emulsifying, mixing or grinding materials, of the kind in which materials are introduced between the opposing faces of discs or like elements which are rotated relatively to one another at high speed, and is particularly concerned with machines of the kind in question which are constructed to operate at extremely high speeds, the grinding members being preferably capable of accurate adjustment even while the machine is running so as to insure that the surfaces or portions of the surfaces of the grinding members may be brought into such position that they operate in close contiguity one with the other.

The type of machine to which the invention particularly relates is commonly described as a "colloid mill".

With mills of the character in question the force with which the material is ejected by centrifugal action from between the working faces of the rotating members frequently results, where solids or mixtures of solids or liquids are being treated, in the ground material building up on the adjacent faces of the casing employed for collecting and leading away the treated material.

Where such machines are employed in the treatment of mixtures of liquids which are insoluble one in the other, as in forming emulsions, the force due to centrifugal action is also sometimes found to break down the emulsion or suspension or cause the degree of dispersion to become coarser. This is apparently in part due to the sudden change in direction of motion of the material or to the rapid deceleration of the motion of the material ejected.

One feature of the invention comprises the provision of means adapted to secure a gradual deceleration of the speed of travel of the material ejected from between the grinding members, or alternatively or simultaneously a gradual change in direction of motion of such material.

Thus in accordance with the invention means may be provided within the casing in which the ejected material is collected adapted gradually to deflect the material from the plane in which it is travelling when it leaves the grinding members and to direct the material on to the portions of the casing serving to collect and discharge it.

For instance, in accordance with the invention, a channel member or channel members of arcuate section may be arranged within the casing adapted to deflect, in the manner above indicated, the material issuing from between the working faces of the rotating members.

The arcuate member may form a substantially complete annulus extending about the periphery of the grinding members and it may be provided with one or more channels of arcuate cross-section. In the latter case the wall between the two channels may be in the form of a knife-edge located adjacent to the plane or planes in which the faces of the rotating members are located.

Alternatively, the deflectors may be constituted by a plurality of members furnished with suitably curved faces and spaced apart within the casing about the periphery of the rotating members. When this construction is employed the several sections may be arranged to overlap and be suitably curved to secure the travel of the material ejected in a tangential direction relatively to the periphery of the rotating members, the curvature being such as to reduce the reaction between the material ejected and the deflectors.

Where the deflectors are formed in sections they may be provided with an element adapted to deflect the wall of the material toward one side of the casing or toward both sides according to requirements, and the number of these sections and their arrangement and individual forms may be varied according to the angle at which the material is ejected from between the working faces of the rotating members.

Where each of the sections is arranged to deflect the material toward both sides of the casing the wall between the two portions of the deflectors may be brought to a knife-edge and the edges of the individual sections may be in staggered relationship one with the other.

Similarly, where the deflector is substantially in the form of an annulus providing two channels the material between the channels, as above stated, may also be brought to a knife-edge and the knife-edge may in such case form a staggered line.

Where the deflector is substantially in the form of an annulus, adjacent to its lower portion, openings will be provided to permit the material to be collected thereby to be discharged into the portion of the casing in which an outlet for the material is furnished.

A further feature of the invention comprises furnishing the rotating members with a collecting channel adapted gradually to arrest or change the direction of motion of the material.

Thus, for instance, where the rotating members are furnished with hardened rings, which are accurately machined and may operate as grinding members, a circumferential channel may be furnished in the rotating members and surrounding the aforesaid rings.

The form of the channel is conveniently such that when the two grinding members are in position one against the other a channel of more or less pear-shaped cross-section is provided, the apex of the section being directed towards the axis of rotation of the grinding members.

The channel in question is preferably provided at intervals with outlet holes and these holes may be formed tangential to the disc.

Conveniently, but not necessarily, where the rotating members are so formed with channels, deflectors of the character specified above may be provided.

A further feature of the invention consists in the formation of the rings (which may be described as "grinding" rings) in material adapted to be accurately machined in order to secure the desired small interval between, and these rings may have machined in their faces circumferential grooves of any suitable form. Conveniently, however, they are of wedge-shape or triangular cross-section.

A further and optional feature of the invention consists in forming the casing within which the rotating members operate with a hinged portion on which for example the hopper or like means for introducing the material may be mounted.

In accordance with this feature of the invention the casing may be divided substantially in the same plane as that in which the plane between the working faces of the rotating members is located.

With this construction one side of the casing may be swung out of position and thus access to the rotating members may be conveniently secured.

The invention will be described further in detail with reference to the accompanying drawings, in which:—

Figure 4:
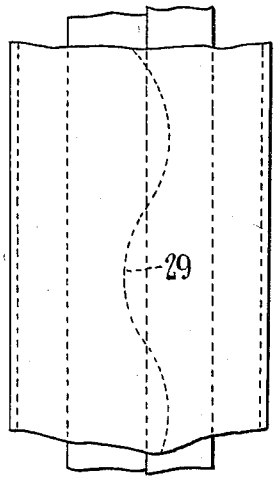
Figure 5:
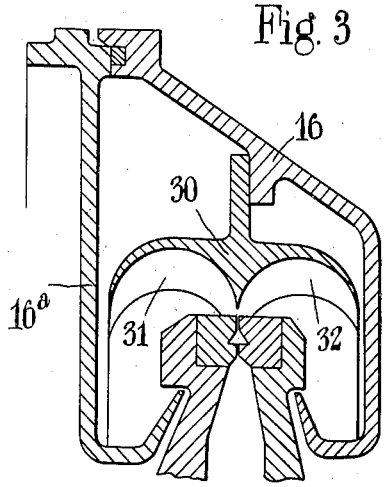
Figure 6:
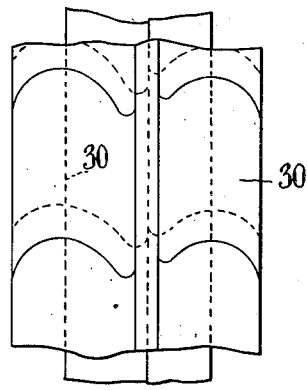
Figure 7:
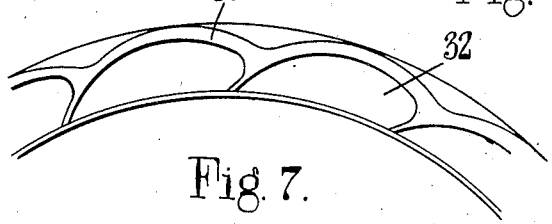

Figure 4 being a fragmentary view in plan of the same;

Figures 5 and 6 are similar views of a further alternative construction of deflecting means, while Figure 7 is a fragmentary view in a plane at right angles to the plane of section of Figure 5;

Figure 8 is a fragmentary view in cross-section showing a further alternative form of deflector, while Figure 9 is a plan view illustrating the same;

Figure 10 is a fragmentary view of a construction in which the deflecting means is associated with the rotary discs of the machine;

Figure 11 is a plan view, and

Figure 12 is a side elevation illustrating this construction;

Figure 13 is a fragmentary view showing the grinding rings located eccentrically in the discs, and Figure 14 is a view of an alternative construction in which the deflecting means is rigidly connected or integral with the rotary discs.

Figure 1:
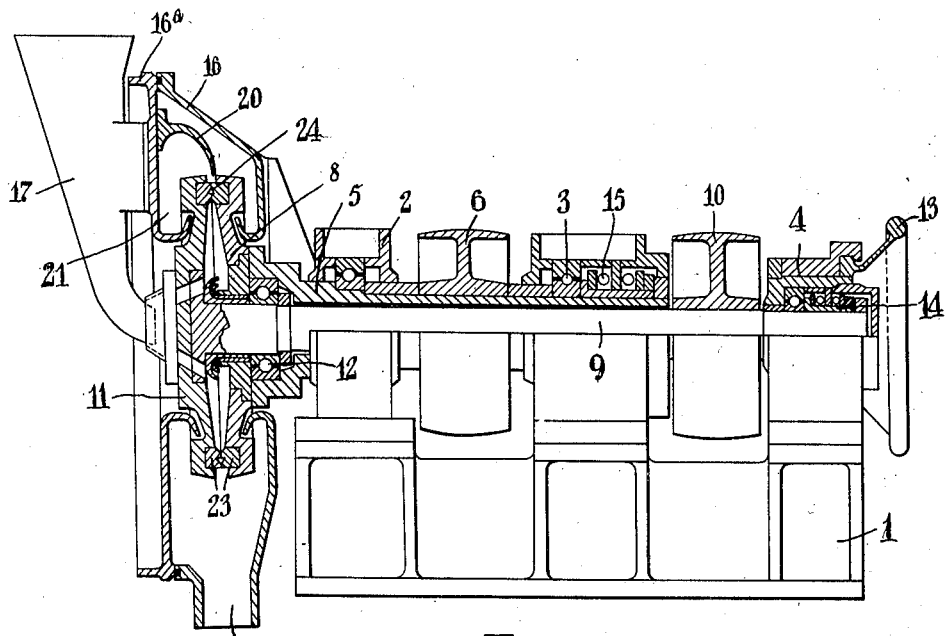
Figure 1 is a side elevation partly in section of a machine in accordance with the invention.

Referring to Figure 1 of the drawings, the base of the machine is indicated by the reference 1; on this base there are mounted the bearings 2, 3 and 4, of which the bearings 3 and 4 function as the bearings for the hollow shaft 5 on which the pulley 6 is mounted. To the hollow shaft is connected rigidly the disc 8 and within the hollow shaft a second shaft 9 provided with a pulley 10 and connected with the disc 11 is arranged. This second shaft is provided with a bearing 12 within the aforesaid hollow shaft and it is also journalled in the bearing 4 above referred to while a hand wheel 13 is associated with this bearing for the purpose of adjusting the clearance between the two discs, the hand wheel operating upon the shaft through the thrust bearing 14, a thrust bearing 15 being located in the plummer block carrying the bearing 3 for taking up the thrust on the hollow shaft.

Figure 2:
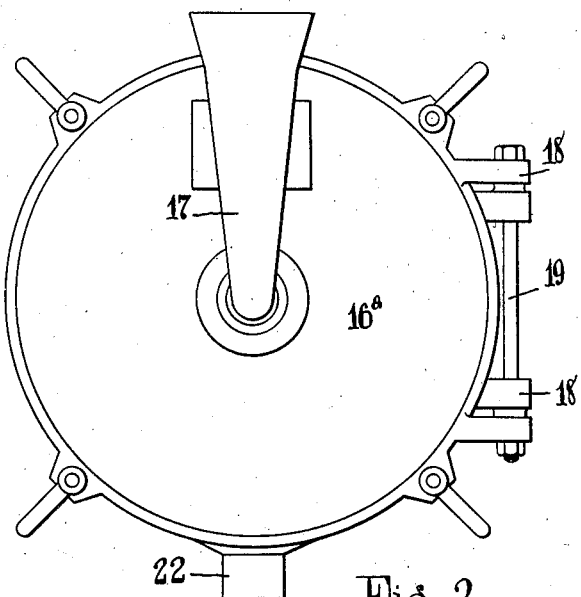
Figure 2 is an end elevation thereof.

The casing for the discs which is secured in fixed relationship with the base of the machine comprises two main portions, of which the portion 16 is fixed while the other portion 16ª furnished with a hopper 17 is connected with the first-mentioned portion through the intermediary of the lugs 18 and the hinge pin 19 (see Figure 2).

In the construction shown in Figure 1 the deflecting member is indicated by the reference 20 and is in the form of a portion of an annulus the internal surface of which is curved so as to secure a gradual alteration in direction of the flow of the material and the gradual deceleration of the speed of travel of the same after it has been ejected from between the discs. This member is adapted to direct the material into the trough 21 from which it will travel to the outlet 22 and as shown in Figure 1 the discs are provided with grinding rings 23 furnished with V-shaped grooves 24.

In Figures 3, 4, 5, 6, 8, 9, 10, 11, 12, 13 and 14, the discs are indicated by the references 8 and 11 while the grinding rings, where they are provided, are indicated by the reference 23, the grooves in these rings being indicated by the reference 24.

Figure 3:
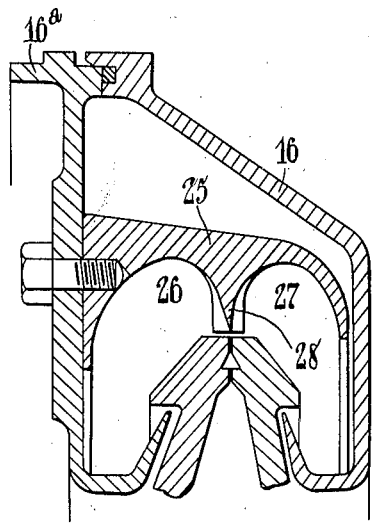
Figure 3 is a view in section on a larger scale showing an alternative form of deflecting means.

In the construction illustrated in Figures 3 and 4 the deflecting member 25 is in the form of an annulus providing two channels of arcuate cross-section, the wall or division 28 between the two channels being brought to a knife-edge where it is located adjacent to the plane in which the faces of the rotating members lie, the edge of the wall or division located between the two channels being staggered or curved as shown more clearly by the dotted line 29 in Figure 4.

In the construction illustrated in Figures 5, 6 and 7 and deflectors are constituted by a plurality of members 30 each furnished with suitably curved faces 31 and 32 adapted to deflect the material delivered from between the rotating discs into the channels located on opposite sides of the casing. The arrangement of the members in question so as to overlap is more clearly seen in Figures 6 and 7.

In the construction shown in Figures 8 and 9 the deflecting members 33 are formed of sheet metal and are secured to brackets 34, the mode of arranging these members being indicated in plan in Figure 9.

Referring to Figures 10, 11 and 12, a construction is shown in which the rotating members themselves are provided with collecting channels. In this construction the channels 35 and 36 form together a channel of substantially pear-shaped cross-section, the apex of the section being directed toward the axis of rotation of the discs. At intervals the channel is provided with inlet holes 37 and 38.

In Figure 14 a construction is shown in which the deflecting channels are formed in the grinding rings secured to the discs. In this figure the reference 39 indicates one of the rings, 39ª indicating the other ring, while 40 indicates the deflecting channel which in the construction shown is provided at intervals with discharge openings 41.

Referring to Figure 13, 42 and 42ª indicate grinding rings which, as shown in this figure, are located eccentrically in the discs.

In the operation of apparatus in accordance with the invention the discs 8 and 11 (see, for instance, Figure 1) may be rotated in the same or in opposite directions, the material to be treated being introduced between these discs by way of the hopper 17. The rotary motion imparted to the discs will cause the material to be driven outward by centrifugal force so that it will pass between what may be described as the grinding faces of these discs, which grinding faces are in certain of the constructions illustrated formed by the insertion in the discs of machined rings 23 in the opposite faces of which circumferential grooves 24 may be formed. These grooves if they are formed eccentrically relatively to the axis of rotation of the discs will function to increase the grinding action as the material entering the grooves will be subjected to a rubbing action owing to the eccentricity of the grooves. The material ejected from between the discs will be delivered in a construction illustrated in Figure 1 on to the deflectors 20 which are so formed as gradually to change the direction of motion of the material thrown out and cause it to be deposited in the channel 21 from which it will finally pass to the outlet 22.

In the construction illustrated in Figures 3 and 4 the material ejected from between the discs will be delivered into the channels 26 and 27, the surfaces of which are so formed as to secure gradual deceleration and a change in direction of motion of the material so ejected, the material being collected as before in channels equivalent to the channel 21 in Figure 1, from which in turn it will pass to the outlet from the casing.

In the construction illustrated in Figures 5, 6 and 7 the material driven out from between the discs will be caught in the pockets 31 and 32 formed in the members 30 and similar deceleration of change in direction of motion of the material will be secured in this way.

In the construction illustrated in Figures 8 and 9 the members 33 operate to secure the deceleration and a change in direction of motion of the material while in the construction illustrated in Figures 10, 11 and 12 the formation of the pockets 35 and 36 secure a like result, the pockets 40 in the construction illustrated in Figure 13 functioning in like manner.

According to requirements, the rotating members may be rotated in the same direction at the same or different speeds or in opposite directions and they may be so mounted that they are moved concentrically or eccentrically relatively to one another.

Where the members are arranged to rotate concentrically, the portions thereof, for instance the rings, formed of material adapted to be accurately machined and which may function to some degree as grinding members may be mounted on the rotating members so that they move eccentrically relatively to the axis of rotation of the members.

As will be understood, the above description is furnished for the purpose of describing the nature of the invention and the constructional details may be varied within wide limits.

Having now described my invention, what I claim as new and desire to secure by Letters Patent is:—

1. A machine for emulsifying, mixing or grinding materials, comprising a casing, rotary disc elements within the casing adapted to be rotated relatively to one another at a high speed, means for rotating the disc elements, means for introducing material between the opposing faces of the said elements and means within the casing by which the material ejected by centrifugal force from between the faces of the disc elements is collected, said means being adapted gradually to deflect the material from the plane in which it is travelling as it is ejected from between the disc elements and to direct the material on to the portions of the casing serving to collect and discharge it.

2. A machine for emulsifying, mixing or grinding materials, comprising a casing, disc elements within the casing adapted to be rotated relatively to one another at a high speed, means for rotating the disc elements, means for introducing material between the opposing faces of the said elements and a channel member of arcuate section within the casing adapted gradually to deflect the material from the plane in which it is travelling as it is ejected from between the disc elements and to direct the material on to the portions of the casing serving to collect and discharge it.

3. A machine for emulsifying, mixing or grinding materials, comprising a casing, disc elements within the casing adapted to be rotated relatively to one another at a high speed, means for rotating the disc elements, means for introducing material between the opposing faces of the said elements and a member formed with two channels of arcuate section within the casing adapted gradually to deflect the material from the plane in which it is travelling as it is ejected from between the disc elements and to direct the material on to the portions of the casing serving to collect and discharge it.

4. A machine for emulsifying, mixing or grinding materials, comprising a casing, disc elements within the casing adapted to be rotated relatively to one another at a high speed, means for rotating the disc elements, means for introducing material between the opposing faces of the said elements and collecting channels formed on each of the disc elements, said collecting channels being adapted gradually to arrest the motion of the material ejected from between the adjacent faces of the disc elements.

5. A machine for emulsifying, mixing or grinding materials, comprising a casing, disc elements within the casing adapted to be rotated relatively to one another at a high speed, means for rotating the disk elements, means for introducing material between the opposing faces of the said elements and collecting channels formed on each of the disc elements, said collecting channels being adapted gradually to arrest and change the motion of the material ejected from between the adjacent faces of the said elements.

6. A machine for emulsifying, mixing or grinding materials, comprising a casing, disc elements within the casing adapted to be rotated relatively to one another at a high speed, means for rotating the disc elements, means for introducing material between the opposing faces of the said elements, collecting channels formed on each of the disc elements, said collecting channels being adapted gradually to arrest the motion of the material ejected from between the adjacent faces of the disc elements, and tangential outlets in said channels.

7. A machine for emulsifying, mixing or grinding materials, comprising a casing, disc elements within the casing adapted to be rotated relatively to one another at a high speed, means for rotating the disc elements, means for introducing material between the opposing faces of the said elements, collecting channels formed on each of the disc elements, said collecting channels being adapted gradually to arrest and change the motion of the material ejected from between the adjacent faces of the said elements, and tangential outlets in said channels.

8. A machine for emulsifying, mixing or grinding materials, comprising a casing, divided vertically into two portions, a hinged connection between said portions, rotary disc elements within the casing adapted to be rotated relatively to one another at a high speed, means for rotating the disc elements, means for introducing material between the opposing faces of the said elements and means within the casing by which the material ejected by centrifugal force from between the faces of the disc elements is collected, said means being adapted gradually to deflect the material from the plane in which it is travelling as it is ejected from between the disc elements and to direct the material on to the portions of the casing serving to collect and discharge it.

9. A machine for emulsifying, mixing or grinding materials, comprising a casing, divided vertically into two portions, a hinged connection between said portions, disc elements within the casing adapted to be rotated relatively to one another at a high speed, means for rotating the disc elements, means for introducing material between the opposing faces of the said elements and a channel member of arcuate section within the casing adapted gradually to deflect the material from the plane in which it is travelling as it is ejected from between the disc elements and to direct the material on to the portions of the casing serving to collect and discharge it.

In testimony whereof I have signed my name to this specification.

ROBERT SURTEES.